(12) United States Patent
Chan

(10) Patent No.: US 11,593,740 B1
(45) Date of Patent: Feb. 28, 2023

(54) COMPUTING SYSTEM FOR AUTOMATED EVALUATION OF PROCESS WORKFLOWS

(71) Applicant: Wells Fargo Bank, N.A., San Francisco, CA (US)

(72) Inventor: Huanchee Chan, Fort Mill, SC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 12 days.

(21) Appl. No.: 17/185,617

(22) Filed: Feb. 25, 2021

(51) Int. Cl.
| | |
|---|---|
| *G06Q 10/06* | (2012.01) |
| *G06Q 10/0633* | (2023.01) |
| *G06Q 10/0631* | (2023.01) |
| *G06Q 10/0637* | (2023.01) |

(52) U.S. Cl.
CPC ............. *G06Q 10/0633* (2013.01); *G06Q 10/06311* (2013.01); *G06Q 10/06316* (2013.01); *G06Q 10/06375* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | |
|---|---|---|---|
| 9,069,808 B2 | 6/2015 | Kementsietsidis et al. | |
| 9,477,937 B2 | 10/2016 | Favre et al. | |
| 2005/0071209 A1* | 3/2005 | Tatavu | G06Q 10/10 705/7.12 |
| 2007/0021995 A1 | 1/2007 | Toklu et al. | |
| 2010/0325054 A1* | 12/2010 | Currie | G06Q 10/10 705/301 |
| 2013/0226639 A1* | 8/2013 | Yokoyama | G06Q 10/06 705/7.14 |
| 2014/0129285 A1* | 5/2014 | Wu | G06Q 10/0633 705/7.27 |
| 2014/0129560 A1 | 5/2014 | Grokop et al. | |

(Continued)

FOREIGN PATENT DOCUMENTS

| | | |
|---|---|---|
| CN | 105739979 B | 7/2016 |
| CN | 108628665 A | 10/2018 |

OTHER PUBLICATIONS

Kong, Nicholas, et al. "Delta: a tool for representing and comparing workflows." Proceedings of the SIGCHI Conference on Human Factors in Computing Systems. 2012. (Year: 2012).*

(Continued)

*Primary Examiner* — Alan S Miller
(74) *Attorney, Agent, or Firm* — Shumaker & Sieffert, P.A.

(57) ABSTRACT

An example method includes obtaining data associated with a plurality of process workflows, performing an automated workflow analysis of the data at least by (i) evaluating workflow structures to identify at least one similarity between one or more portions of the process workflows, wherein the workflow structures are modeled from the process workflow data and, (ii) responsive to evaluating the workflow structures, clustering, based on the at least one similarity, the portions of the process workflows into at least one common process group that is shared between the process workflows, identifying, based on the at least one common process group shared between the process workflows, at least one process improvement that is associated with at least one of the process workflows, and outputting, by the computing system, a recommendation associated with the at least one process improvement.

25 Claims, 5 Drawing Sheets

(56) References Cited

U.S. PATENT DOCUMENTS

| | | | | |
|---|---|---|---|---|
| 2014/0156623 | A1* | 6/2014 | Guha | G06F 16/358 |
| | | | | 707/706 |
| 2014/0215495 | A1* | 7/2014 | Erich | G06F 11/3438 |
| | | | | 719/318 |
| 2014/0304027 | A1 | 10/2014 | Wu et al. | |
| 2015/0020048 | A1 | 1/2015 | Misra et al. | |
| 2017/0103441 | A1 | 4/2017 | Kolb et al. | |
| 2017/0371632 | A1* | 12/2017 | Bullis | G06Q 10/101 |
| 2017/0371715 | A1* | 12/2017 | Bush, III | G06F 9/4881 |
| 2019/0026634 | A1* | 1/2019 | Homeyer | G06N 3/0445 |
| 2019/0258976 | A1* | 8/2019 | Parees | G06F 8/20 |

OTHER PUBLICATIONS

Jung et al., "Workflow Clustering Method Based on Process Similarity", Computational Science and Its Applications, vol. 3981, May 2006, 11 pp.

Ordonez et al., "A business process clustering algorithm using incremental covering arrays to explore search space and balanced Bayesian information criterion to evaluate quality of solutions", PLoS ONE, Jun. 13, 2019, 27 pp.

Samo et al., "Clustering of ERP Business Process Fragments", IEEE, Nov. 2013, 6 pp.

U.S. Appl. No. 17/144,986, filed Jan. 8, 2021, naming inventors Mondloch et al.

* cited by examiner

COMPUTING SYSTEM FOR AUTOMATED EVALUATION OF PROCESS WORKFLOWS

TECHNICAL FIELD

The present disclosure relates to computing systems.

BACKGROUND

In many instances, customers may use one or more computing devices to interact with servers or other systems that provide products and/or services. For example, a customer may use a computing device (e.g., smartphone, personal computer) to access a server that is configured to provide various products and/or services (e.g., online banking or financial products/services). The server and/or an agent device used by an agent may interact with the customer's computing device and utilize one or more process workflows to execute business processes and to assist with the acquisition or management of offered products and/or services.

SUMMARY

In general, this disclosure describes techniques for performing an automated and technology-driven process for evaluating an organization's process workflows and providing recommended improvements to one or more portions of these workflows. For instance, the described techniques may perform an automated evaluation of such process workflows by, e.g., comparing and clustering portions of these workflows, and recommending improvements to the process workflows based on similarities and/or differences between these portions.

Traditional process workflow improvements tend to require time-intensive, multi-person communication between individuals having specific subject-matter knowledge, as well as a broad understanding of the organization's process workflows. The conventional approach of comparing processes to identify similarity typically requires painstaking effort by one or more subject-matter experts to understand the intricate details of the two process being compared. However, using the disclosed techniques, a process evaluation computing system may perform an automated evaluation of process workflows associated with an organization's business processes, and may further provide recommended improvements to such process workflows. The disclosed techniques provide an automated and technology-driven approach, which may produce process evaluation results in a significantly faster turnaround time.

In some cases, the disclosed process evaluation computing system may evaluate the similarity of workflow structures (e.g., network graphs) that represent the process workflows by comparing the similarity between process or sub-process pairs using one or more technological approaches, such as isomorphism-based network graph comparison, computer vision-based network graph comparison, and/or knowledge-based comparison. The outputs of these approaches may be tagged and consolidated for use in clustering one or more portions of the workflow processes. The implementation of the disclosed techniques may thereby leverage the use of these technology approaches to perform one or more of process screening, process similarity assessment, and/or process clustering, which can result in significantly reduced process evaluation time. In addition, as a result of the automated process evaluation, the disclosed techniques enable the output of recommended improvements to one or more portions of process workflows, such as process consolidation, process standardization, process elimination, process simplification, and the like.

As one example, this disclosure is directed to a method that includes obtaining, by a computing system comprising one or more processors, process workflow data associated with a plurality of process workflows, wherein each of the process workflows comprises a plurality of tasks that are carried out to execute a respective business process and to achieve a respective business outcome, and performing, by the computing system, an automated workflow analysis of the process workflow data at least by evaluating, by the computing system, workflow structures to identify at least one similarity between one or more portions of the process workflows, wherein the workflow structures are modeled from the process workflow data, and responsive to evaluating the workflow structures, clustering, by the computing system and based on the at least one similarity, the one or more portions of the process workflows into at least one common process group that is shared between the process workflows. The example method further includes identifying, by the computing system and based on the at least one common process group shared between the process workflows, at least one process improvement that is associated with at least one of the process workflows, and outputting, by the computing system, a recommendation associated with the at least one process improvement.

As another example, this disclosure is directed to a computing system that includes one or more processors and at least one computer-readable storage device. The at least one computer-readable storage device stores instructions that are executable by the one or more processors to: obtain process workflow data associated with a plurality of process workflows, wherein each of the process workflows comprises a plurality of tasks that are carried out to execute a respective business process and to achieve a respective business outcome; perform an automated workflow analysis of the process workflow data at least by: evaluating workflow structures to identify at least one similarity between one or more portions of the process workflows, wherein the workflow structures are modeled from the process workflow data; and responsive to evaluating the workflow structures, clustering, based on the at least one similarity, the one or more portions of the process workflows into at least one common process group that is shared between the process workflows; identify, based on the at least one common process group shared between the process workflows, at least one process improvement that is associated with at least one of the process workflows; and output a recommendation associated with the at least one process improvement.

As another example, this disclosure is directed to a computer-readable storage device storing instructions that, when executed, cause at least one processor to: obtain process workflow data associated with a plurality of process workflows, wherein each of the process workflows comprises a plurality of tasks that are carried out to execute a respective business process and to achieve a respective business outcome; perform an automated workflow analysis of the process workflow data at least by: evaluating workflow structures to identify at least one similarity between one or more portions of the process workflows, wherein the workflow structures are modeled from the process workflow data; and responsive to evaluating the workflow structures, clustering, based on the at least one similarity, the one or more portions of the process workflows into at least one common process group that is shared between the process workflows; identify, based on the at least one common process group shared between the process workflows, at least one process improvement that is associated with at least one of the process workflows; and output a recommendation associated with the at least one process improvement.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
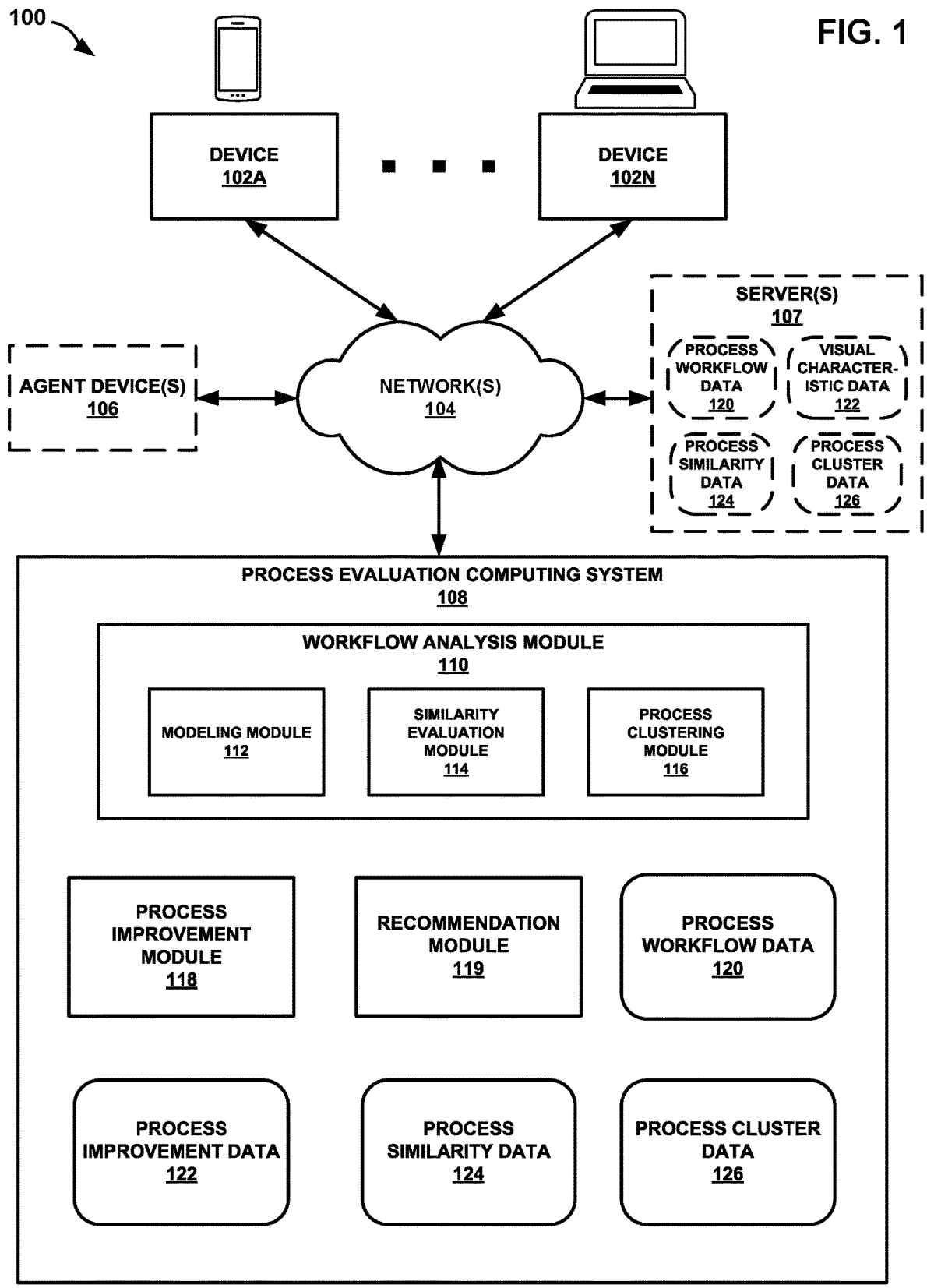
FIG. 1 is a block diagram illustrating an example distributed system that includes a process evaluation computing system configured to perform an automated evaluation of process workflows, in accordance with techniques of this disclosure.

FIG. 1 is a block diagram illustrating an example distributed system 100 having a process evaluation computing system 108 that is configured to perform an automated evaluation of process workflows, in accordance with techniques of this disclosure. System 100 includes one or more computing devices 102A-102N (collectively, "devices 102"), one or more optional agent computing devices 106 (hereinafter, "agent devices 106"), one or more networks 104, one or more servers 107, and a process evaluation computing system 108. Devices 102 may, e.g., be any type of computing device (e.g., a mobile smartphone, a tablet computer, a personal digital assistant (PDA), a laptop computer, a portable gaming device, a portable media player, a wearable computing device). Servers 107 may, in various examples, be one or more web servers, such as when networks 104 includes an Internet network. Agent devices 106, servers 107, and/or process evaluation computing system 108 may each comprise one or more computing devices, where each computing device may include one or more processors.

Devices 102, agent devices 106, servers 107, and process evaluation computing system 108 are communicatively coupled via one or more networks 104, which may comprise one or more wireless and/or wired networks. In some examples, and as shown in FIG. 1, process evaluation computing system 108 is separate from servers 107. In other examples (not shown), process evaluation computing system 108 may be part of or otherwise included in one or more of servers 107.

The components illustrated in FIG. 1 may comprise one or more physical or virtual components. For instance, in various examples, a device, system, or server shown in FIG. 1 may comprise a physical entity (e.g., a computing device, a computer server, a quantum computer, a desktop computer, a tablet computer, a laptop computer, smartphone, etc.) and/or virtual entity (e.g., virtual machine, application software in a computing machine, cloud computing system, etc.). In certain examples, a device, system, or server may include one or more computers that process information and/or devices with embedded computers such as smartphones, television sets, radios, wireless headsets, digital cameras, global positioning system (GPS) based navigators, automated teller machines, and so forth. Some devices conduct a single function and others carry out multiple functions.

As indicated above, devices 102 may interact with servers 107 or even directly with process evaluation computing system 108. For example, a user (e.g., process developer, customer, client, business user) may use one of devices 102 to access one or more of servers 107 and/or process evaluation computing system 108. Servers 107 and/or process evaluation computing system 108 may be configured to provide various (e.g., online) products and/or services. For instance, a customer may use one of devices 102 to access servers 107 that are configured to provide various products and/or services (e.g., online banking or financial products/services). Servers 107 and/or agent devices 106 used by one or more agents may interact with devices 102 and utilize one or more process workflows to execute business processes and to assist with the acquisition or management of offered products and/or services. Process workflows can often be complex and depend on multiple contributors, and organization of these workflows helps improve efficiency and potential inconsistencies between portions of the workflows.

As noted above, traditional process workflow improvements tend to require time-intensive, multi-person communication between individuals having specific subject-matter knowledge as well as a broad understanding of the organization's process workflows. Changing a process workflow often requires expertise about the current workflow as well as insight on opportunities for improvement by understanding comparable workflows. The conventional approach of comparing processes to identify similarity typically requires significant effort by one or more subject-matter experts to understand the intricate details of the two process being compared. However, using the disclosed techniques, process evaluation computing system 108 may perform an automated evaluation of process workflows associated with an organization's business processes, and may further provide recommended improvements to such process workflows. The disclosed techniques provide an automated and technology-driven approach, which may produce process evaluation results in a significantly faster turnaround time.

In general, this disclosure describes techniques for process evaluation computing system 108 performing an automated and technology-driven process for evaluating an organization's process workflows and providing recommended improvements to one or more portions of these workflows. For instance, process evaluation computing system 108 may perform an automated evaluation of two or more of such process workflows (e.g., by using network graphs that are modeled from these workflows), comparing and clustering portions of these workflows (e.g., using computer vision-based comparison techniques), and recommending improvements to the process workflows based on identified similarities and/or differences. Process evaluation computing system 108 may in various cases perform such automated evaluation within necessarily incorporating human involvement or human subject-matter knowledge or expertise about the process workflows.

In some cases, process evaluation computing system 108 may evaluate the similarity of workflow structures (e.g., network graphs) that represent the process workflows by comparing the similarity between process or sub-process pairs using one or more technological approaches, such as isomorphism-based network graph comparison, computer vision-based network graph comparison, and/or knowledge-based comparison. The outputs of these approaches may be tagged and consolidated for use in clustering one or more portions of the workflow processes. Process evaluation computing system 108 may thereby leverage the use of these technology approaches to perform one or more of process screening, process similarity assessment, and/or process clustering, which can result in significantly reduced process evaluation time. In addition, as a result of the automated process evaluation, process evaluation computing system 108 may output recommended improvements to one or more portions of process workflows, such as process consolidation, process standardization, process elimination, process simplification, and the like.

Figure 2:
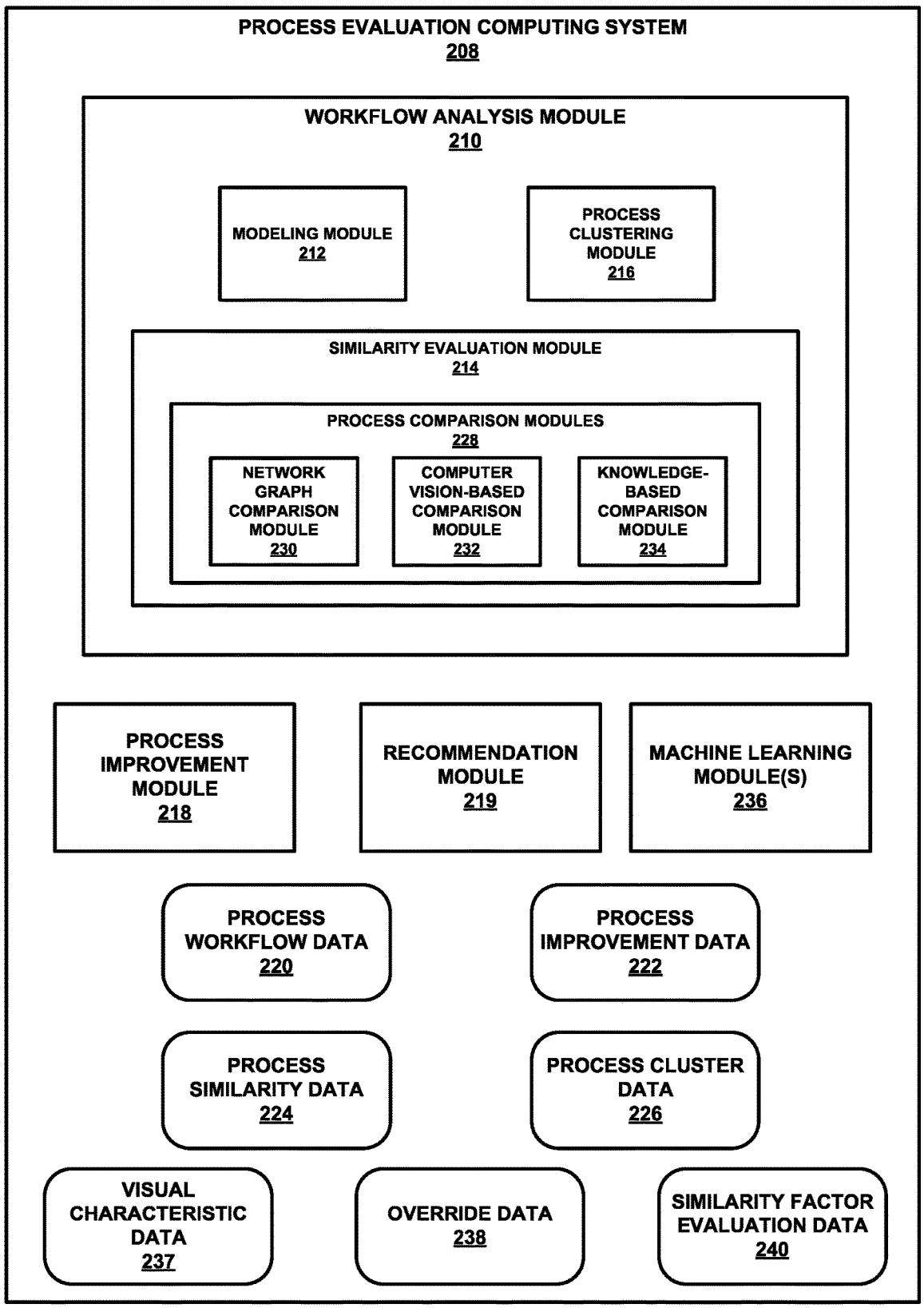
FIG. 2 is a block diagram illustrating further example details of the process evaluation computing system shown in FIG. 1, in accordance with techniques of this disclosure.

As shown in FIG. 1, process evaluation computing system 108 includes various different functional modules that may be executed by one or more processors of computing system 108. These functional modules include a workflow analysis module 110, a process improvement module 118, and a recommendation module 119. Workflow analysis module 110 also includes a modeling module 112, a similarity evaluation module 114, and a process clustering module 116. In certain examples, computing system 108 may include fewer or more modules than shown in FIG. 1 (e.g., such as shown in FIG. 2). Computing system 108 shown in FIG. 1 also stores or otherwise includes various different types of data that may be used by the functional modules during execution. For instance, computing system 108 includes process workflow data 120, process improvement data 122, process similarity data 124, and process cluster data 126. Data 120, 122, 124, 126 may be stored in one or more data repositories (e.g., databases) locally on computing system 108 and/or external to computing system 108. For instance, in certain examples, one or more of data 120, 122, 124, 126 may be stored on one or more external servers (e.g., one or more of servers 107), and one or more portions of this data may be downloaded to or otherwise accessed by computing system 108. As indicated in FIG. 1, in some cases, servers 107 may store one or more portions of data 120, 122, 124, 126.

As will be described in more detail below, computing system 108 (e.g., using workflow analysis module 110) may obtain process workflow data 120, which is data associated with a number of process workflows. For example, computing system 108 may retrieve or access process workflow data 120 from servers 107, and may then store a local copy of process workflow data 120 on computing system 108. In other examples, agent devices 106 and/or devices 102 may provide process workflow data 120 to computing system 108. Each of the process workflows associated with process workflow data 120 may comprise a group of tasks that are carried out to execute a respective business process and to achieve a respective business outcome. For instance, a process workflow may include a collection of data, rules, and/or tasks that are used during execution of a business process in order to achieve a particular business outcome. A business process may comprise a collected of interrelated steps that are performed in order to achieve, e.g., an organizational goal.

Process workflow data 120 associated with one or more process workflows may contain attributes of process detail activities (e.g., business process activities or steps), points of interfacing data related to interfacing between entities contributing to the workflows, and/or other attributes such as risk, control information, and the like, which may be useful in categorizing and/or tagging data or relationships in the process workflow (e.g., tagging nodes in networks graphs that represent the process workflows). For example, process workflow data 120 may represent business process data of particular business groups. In certain cases, process workflow data 120 may include data having a particular or standard definition markup format (e.g., in iGrafx or compatible markup language format). In some examples, process workflow data 120 may also be formatted as a network graph with nodes and edges. In other cases, modeling module 112 may model process workflow data 120 as a workflow structure such as a network graph.

Workflow analysis module 110 may then perform an automated workflow analysis of process workflow data 120. For example, workflow analysis module 110 may use modeling module 112, similarity evaluation module 114, and process clustering module 116 to perform this automated workflow analysis. Modeling module 112 may, based on process workflow data 120, model the process workflows as workflow structures that represent the process workflows. For example, modeling module 112 may model the process workflows as network graphs that represent the process workflows, as will be described in more detail below. As noted above, in some cases, process workflow data 120 obtained by workflow analysis module 110 may already be formatted as a workflow structure such as a network graph, in which case modeling module 112 may perform minimal or no further modeling of process workflow data 120.

Similarity evaluation module 114 of workflow analysis module 110 may evaluate the workflow structures to identify at least one similarity between one or more portions of the process workflows. Similarity evaluation module 114 may store information associated with any such identified similarities in process similarity data 124. Process similarity data 124 may include information identifying such similarities (e.g., attributes, metadata, characteristics), along with identifiers of the portions of the process workflows that are associated with these similarities.

Responsive to similarity evaluation module 114 evaluating the workflow structures, process clustering module 116 may be configured to cluster, based on the at least one similarity, the one or more portions of the process workflows into at least one common process group that is shared between the process workflows. For instance, process clustering module 116 may cluster different portions of process workflows into different process clusters or groups based on identified similarities between the process workflows, where each process cluster or group may have similar process properties or characteristics. In certain examples, and as will be described in more detail below, process clustering module 116 may perform clustering operations using network analysis and/or artificial intelligence driven techniques with respect to network graphs that represent process workflows. Process clustering module 116 may store clustering information associated with identified clusters within process cluster data 126. In certain examples, computing system 108 may export or share process similarity data 124 and/or process cluster data, including any updates, with servers 107.

Process improvement module 118 of computing system 108 may identify, based on the at least one common process group shared between the process workflows, at least one process improvement that is associated with at least one of the process workflows. For instance, process improvement module 118 may identify process improvements related to one or more changes to at least one of the workflows. These changes may be associated with one or more of process consolidation, process standardization, process elimination, process simplification for at least one of the workflows. Process improvement module 118 may store information associated with the at least one process improvement in process improvement data 122. Upon process improvement module 118 identifying any such process improvements, recommendation module 119 may then output a recommendation associated with these identified process improvements. For example, recommendation module 119 may output the recommendation to one or more of agent devices 106 and/or devices 102.

As noted earlier above, the conventional approach of comparing processes to identify similarity typically requires painstaking effort by one or more subject-matter experts to understand the intricate details of the two process being compared. However, using the disclosed techniques, a process evaluation computing system may perform an automated evaluation of process workflows associated with an organization's business processes, and may further provide recommended improvements to such process workflows. The disclosed techniques provide an automated and technology-driven approach, which may produce process evaluation results in a significantly faster turnaround time. In some cases, the evaluation process may answer matching questions associated with, e.g., two process workflows, such as whether the two process workflows are generally similar, whether a portion of one process workflow is similar to a portion (e.g., subset) of a second process workflow, and/or what is the likelihood that one or more portions of the two processes can be improved (e.g., consolidated) in a much faster fashion. The disclosed process evaluation computing system may evaluate the similarity of workflow structures (e.g., network graphs) that represent the process workflows by comparing the similarity between process or sub-process pairs using one or more technological approaches, such as isomorphism-based network graph comparison, computer vision-based network graph comparison, and/or knowledge-based comparison. In addition, as a result of the automated process evaluation, the disclosed techniques enable the output of recommended improvements to one or more portions of process workflows, such as process consolidation, process standardization, process elimination, process simplification, and the like.

FIG. 2 is a block diagram illustrating further example details of the process evaluation computing system shown in FIG. 1, in accordance with techniques of this disclosure. In FIG. 2, process evaluation computing system 208 (also referred to herein as "computing system 208") is one example of process evaluation computing system 108 of FIG. 1. Various elements shown in FIG. 2 may have functionality that is similar to elements of FIG. 1 having similar reference numbers. Thus, workflow analysis module 210 may be one example of workflow analysis module 110 (FIG. 1), where modeling module 212 is one example of modeling module 112, process clustering module 216 is one example of process clustering module 116, and similarity evaluation module 214 is one example of similarity evaluation module 114. Process improvement module 218 may be one example of process improvement module 118; recommendation module 219 may be one example of recommendation module 119; process workflow data 220 may be one example of process workflow data 120; process improvement data 222 may be one example of process improvement data 122; process similarity data 224 may be one example of process similarity data 124; and process cluster data 226 may be one example of process cluster data 126.

As also shown in the example of FIG. 2, and as will be discussed in further detail below, similarity evaluation module 214 also includes a group of process comparison modules 228, which are configured to perform comparison operations with respect to different process workflows that are modeled as workflow structures (e.g., network graphs). For instance, process comparison modules 228 may include a network graph comparison module 230, a computer vision-based comparison module 232, and a knowledge-based comparison module 234, as shown in FIG. 2. Process evaluation computing system 208 also includes a machine learning module 236, visual characteristic data 237, override data 238, and similarity factor evaluation data 240.

Similar to process evaluation computing system 108, process evaluation computing system 208 may be configured to determine and provide process improvements associated with one or more process workflows. In some examples, the one or more portions of the process workflows may comprise one or more sub-workflows of the process workflows. For example, each process workflow may include one or more respective sub-workflows. Similarity evaluation module 214 may evaluate workflow structures (e.g., network graphs), which represent the workflow processes, to identify the at least one sub-workflow similarity between one or more sub-workflows of the process workflows.

In some cases, the process workflows may include at least a first process workflow and a second process workflow. The one or more sub-workflows may include at least a first sub-workflow of the first process workflow and a second sub-workflow of the second process workflow. In this example, similarity evaluation module 214 may evaluate the workflow structures representing the process workflows to identify at least a first similarity (e.g., a sub-workflow similarity) between a first portion of the first process workflow (e.g., a first sub-workflow of the first process workflow) and a first portion of the second process workflow (e.g., a first sub-workflow of the second process workflow). Similarity evaluation module 214 may then evaluate the workflow structures representing the process workflows to identify one or more similarities between the first and second process workflows. For instance, similarity evaluation module 214 may identify a first similarity between a first portion of the first process workflow and a first portion of the second process workflow. In addition, in some cases, similarity evaluation module 214 may identify a second similarity between a second portion of the first process workflow and a second portion of the second process workflow. Similarity evaluation module 214 may store information associated with identified similarities in process similarity data 224.

After similarity evaluation module 214 identifies similarities between one or more portions of the first and second process workflows, process clustering module 216 may then generate process groups or clusters based on the identified similarities. For example, process clustering module 216 may cluster, based on at least the first similarity described in the example above, the first portion of the first process workflow and the first portion of the second process workflow into a first common process group that is shared between the first and second process workflows. In addition, clustering module 216 may cluster, based on at least the second similarity described above, the second portion of the first process workflow and the second portion of the second process workflow into a second common process group that is shared between the first and second process workflows. Clustering module 216 may store information associated with identified clusters or groups within process cluster data 226.

Based on the first and second common process groups (e.g., clusters) identified by process clustering module 216, process improvement module 218 may identify at least one process improvement that is associated with at least one of the process workflows. For instance, process improvement module 218 may identify, based on the first common process group shared between the first and second process workflows described in the example above, a first process improvement that is associated with at least one of the first or process workflows. Similarly, process improvement module 218 may identify, based on the second common process group shared between the first and second process workflows, a second process improvement that is associated with at least one of the first or process workflows. Recommendation module 219 may then output these recommended process improvements (e.g., to one or more of devices 102 and/or 106 in FIG. 1 for display). Process improvement module 218 and/or recommendation module 219 may store information associated with identified recommendations within process improvement data 222.

In such fashion, recommendation module 219 may identify at least one process improvement associated with one or more process workflows based upon the common process groups (e.g., process clusters) identified by process clustering module 216. As an example, recommendation module 219 may identify at least one process improvement that is associated with one or more process workflows by determining, based on at least one common process group identified by process clustering module 216 and shared between the process workflows, a likelihood of achieving an improvement to at least one of the process workflows (e.g., via a consolidation) of the one or more portions of the process workflows included in the at least one common process group that is shared between the process workflows.

Responsive to recommendation module 219 determining that the likelihood of achieving the improvement to at least one of the process workflows exceeds a threshold (e.g., user- or system-determined threshold), recommendation module 219 may identify the at least one process improvement that comprises, e.g., a consolidation of the one or more portions of the process workflows included in the at least one common process group. In certain cases, the at least one process improvement that is associated with at least one of the process workflows includes one or more changes to at least one of the workflows. The one or more changes may comprise one or more of a process consolidation, a process standardization, a process elimination, or a process simplification with respect to at least one of the process workflows.

As shown in FIG. 2, similarity evaluation module 214 includes various process comparison modules 228. Process comparison modules 228 includes network graph comparison module 230, computer vision-based comparison module 232, and knowledge-based comparison module 234. In various examples, and as will be described in further detail below, similarity evaluation module 214 may use one or more of network graph comparison, computer vision-based comparison, and knowledge-based comparison of process workflows (e.g., using network graph comparison module 230, computer vision-based comparison module 232, and knowledge-based comparison module 234, respectively), in order to identify similarities or differences between process workflows.

For example, in certain examples, the workflow structures that represent the process workflows may comprise network graphs that represent that process workflows, where the network graphs including nodes and edges that are associated with one or more labels, weights, or directionality. In some cases, the process workflow data 220 obtained by process evaluation computing system 208 may already be modeled as network graphs. In other cases, modeling module 212 may model process workflow data 220 as network graphs that represent the respective process workflows.

Figure 3:
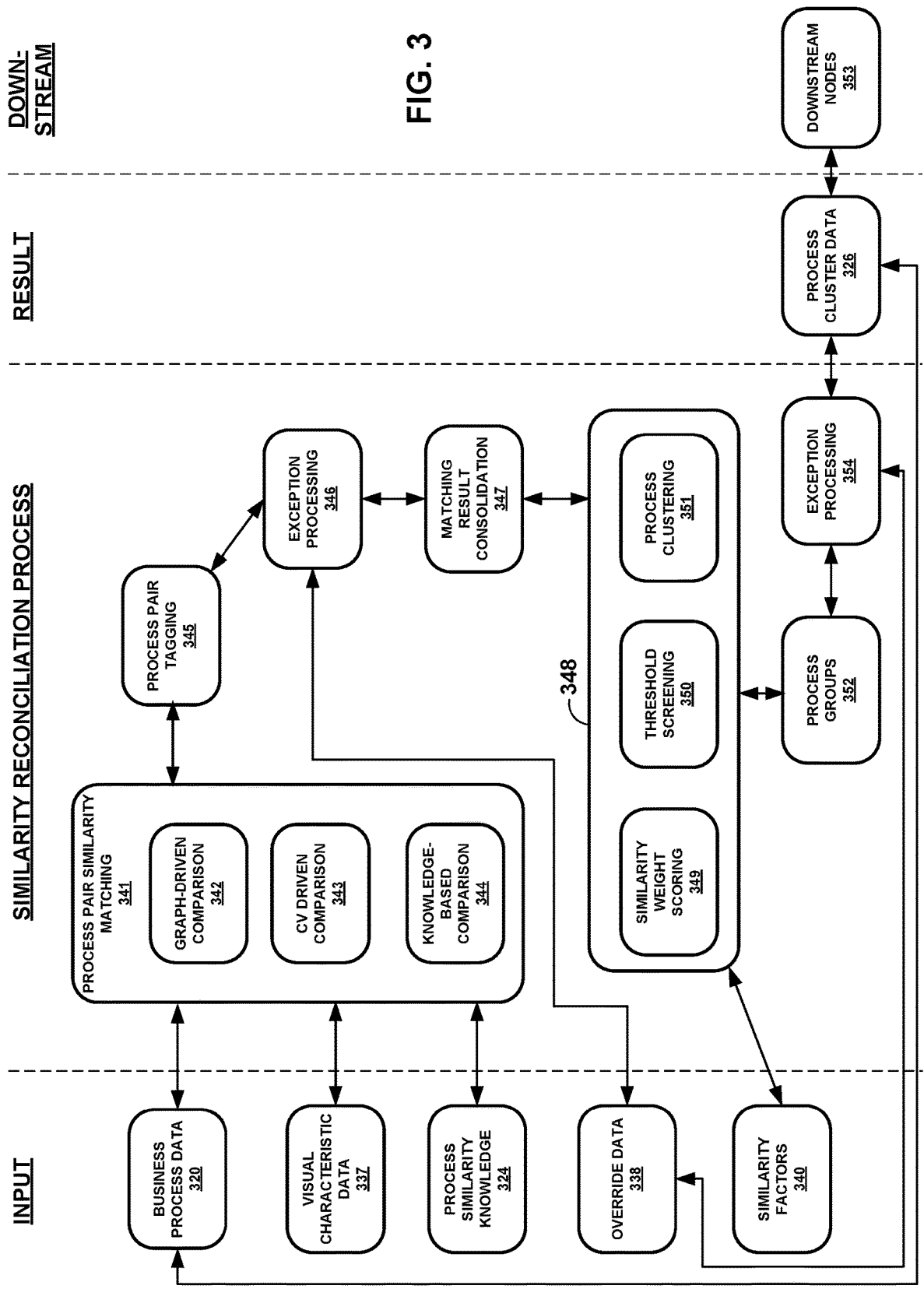
FIG. 3 is a conceptual diagram illustrating an example similarity reconciliation process that is part of a process workflow evaluation, in accordance with techniques of this disclosure.

Network graph comparison module 230 may be configured to evaluate the network graphs that represent the process workflows to identify similarities between portions of the process workflows by identifying, based on one or more network graph comparison techniques, similarities between a group of nodes of the network graphs. FIG. 3 and its related description provide further details. As one example, the network graph comparison techniques may include one or more of isomorphism-based network graph comparison techniques to analyze the network graphs. Process clustering module 216 may then cluster, based on the identified similarities, the group of nodes of the network graphs into the at least one common process group that is shared between the process workflows.

Computer vision-based comparison module 232 may be configured to evaluate the network graphs that represent the process workflows to identify similarities between portions of the process workflows by identifying, based on one or more computer vision-based comparison techniques, similarities between a group of nodes of the network graphs. In these cases, process clustering module 216 may cluster, based on the identified similarities, the group of nodes of the network graphs into the at least one common process group. Computer vision-based comparison module 232 may obtain visual characteristic data 237 that identifies one or more visual characteristics of portions of previously identified process workflows. In some cases, computer vision-based comparison module 232 may obtain visual characteristic data 237 from external servers (e.g., servers 107) or devices (e.g., devices 102 and/or agent devices 106).

Computer vision-based comparison module 232 may be configured to identify, based on the one or more computer vision-based comparison techniques, any similarities between the group of nodes of the network graphs by mapping visual characteristic data 237 to the network graphs to translate the group of nodes of network graphs into node objects each having at least one shape or color-coded visual format, as will be further described in reference to FIG. 3. Computer vision-based comparison module 232 may then perform, based on the one or more computer-vision comparison techniques, an image comparison of at least one of the shapes or color-coded visual formats of the node objects to identify the at least one similarity between the group of nodes representing the one or more portions of the process workflows (e.g., based on similarity matches between shapes and/or colors of the node objects associated with the group of nodes).

Knowledge-based comparison module 234 may also be configured to evaluate the network graphs to identify any similarities between portions of the process workflows. For example, knowledge-based comparison module 234 may identify, based on one or more knowledge-based comparison techniques, these similarities. The knowledge-based comparison techniques utilize pre-existing information that identifies similarities between previously identified process workflows, such as a pre-existing list of previously determined matching pairs of processes, such as described in further detail in reference to FIG. 3. Knowledge-based comparison module 234 may store this information in process similarity data 234. In some cases, knowledge-based comparison module 234 may obtain such information from external servers (e.g., servers 107) or devices (e.g., devices 102 and/or agent devices 106). In some cases, knowledge-based comparison module 234 may obtain such information based on a previously determined similarities between portions of workflow processes by similarity evaluation module 214 (e.g., via a feedback loop).

In addition, according to certain examples, one or more of process comparison modules 228 may obtain (e.g., from servers 107, devices 102, and/or devices 106) similarity factor evaluation data 240 that identifies one or more similarity factors for use in performing similarity reconciliation between process workflows. This similarity factor evaluation data 240 may, in some cases, include a configured set of factors to indicate which aspects of similarity outcome process comparison modules 228 have performed on one or more pairs of process workflows. Similarity factor evaluation data 240 may include one or more evaluation criteria, as well as corresponding weights or weighting factors, which are used by process comparison modules 228 when performing similarity reconciliation operations. For example, process comparison modules 228 may use similarity factor evaluation data 240 to evaluate the network graphs representing the process workflows and identifying any similarities between one or more portions of the process workflows.

In some cases, process comparison modules 228 may also use override data 238 when performing similarity reconciliation operations. Override data 238 may include information representing a set of overrides (e.g., pre-existing overrides provides by servers 107, devices 102, and/or devices 106), which can exist in forms of, e.g., rule-based instructions (e.g., do not match any process pairs between identified portions/sub-workflows, and/or lists of process pairs, which by certain business-driver reasons are either to be paired up as being similar or not to be paired up as similar, regarding of other similarity reconciliation techniques performed by process comparison modules 228.

As shown in FIG. 2, process evaluation computing system 208 may include one or more machine learning modules 236, which may utilize one or more machine learning models. In various examples, workflow analysis module 210 (including modeling module 212, similarity evaluation module 214, and process clustering module 216), process improvement module 218, and/or recommendation module 219 may include or utilize machine learning modules 236 to perform one or more of their respective operations. During execution, machine learning modules 236 may access and/or update the machine learning models. In some examples, machine learning modules 236 may include one or more an artificial intelligence (AI) or deep learning engines capable of analyzing a large volume of data to assist with the modeling, evaluation, and/or clustering of process workflows, and/or with generating or outputting recommended process improvements. Machine learning modules 236 may also be configured to continuously learn which criteria are more important, or have higher weight, based on workflow analysis module 210, process improvement module 218, and/or recommendation module 219, and may correspondingly update the machine learning models.

FIG. 3 is a conceptual diagram illustrating an example similarity reconciliation process that is part of a process workflow evaluation, in accordance with techniques of this disclosure. FIG. 3 illustrates examples inputs to the similarity reconciliation process, as well as the results and downstream operations or components. The similarity reconciliation process and the related downstream operations illustrated in FIG. 3 may be implemented by process evaluation computing system 108 (FIG. 1) and/or process evaluation computing system 208 (FIG. 2). For example, workflow analysis module 110/210 (including modeling module 112/212, similarity evaluation module 114/214, and process clustering module 116/216), process improvement module 118/218, and/or recommendation module 119/219 may implement the similarity reconciliation process and downstream operations shown in FIG. 3. Various elements shown in FIG. 3 may have functionality that is similar to elements of FIG. 1 and/or FIG. 2 having similar reference numbers.

As indicated in FIG. 3, the similarity reconciliation process may utilize various different inputs from different sources or datastores. In some cases, the similarity reconciliation process may also update one or more of these sources or datastores via a feedback loop. The sources or datastores shown in FIG. 3 are 320 (e.g., process workflow data 120/220), 337 (e.g., visual characteristic data 237), 324 (e.g., process similarity data 124/224), 338 (e.g., override data 238), and 340 (e.g., similarity factor evaluation data 240).

In the particular example of FIG. 3, process workflow data 320 may represent base business process data (e.g., of a specific business group). In some cases, servers 107 (FIG. 1), devices 102, and/or devices 106 may provide this process workflow data 320 (e.g., business process data) as input to process evaluation computing system 108 and/or process evaluation computing system 208. Process workflow data 320 may have, in certain cases, a standard definition markup format (e.g., iGrafx or compatible markup language format), and may contain attributes around the given business processes' detailed activities (e.g., steps), and/or additional attributes such as its risk, controls, and the like.

In FIG. 3, visual characteristic data 337 is configuration data that represents visual characteristics of specific parts of a given process or sub-process. Servers 107, devices 102, and/or devices 106 may provide visual characteristic data 337 as input to computing system 108 and/or computing system 208. In various cases, process workflow data 320 may be modeled by network graphs that include nodes and edges. For example, two workflows may be modeled as two network graphs each having their own respective nodes and edges with corresponding weights and/or directions. In these examples, each business process represented by process workflow data 320 can be mapped with visual characteristic data 337 during the similarity reconciliation process to "translate" the process nodes and vertices (or "parts") of the respective network graphs into shape and/or color-coded visual formats (e.g., by modeling module 212). Computer vision-based comparison module 232 of FIG. 2 may then utilize one or more computer vision-based comparison techniques to read these shape and/or color-coded visual formats when performing "image" comparisons of each of the business process pairs.

Process similarity data 324 is configuration data that may represent a pre-existing list of previously determined matching pairs of business processes, either based on manual human intelligence or result of feedback loop extracted from process cluster 326, as indicated in FIG. 3. In some cases, process similarity data 324 may comprise prior process similarity knowledge that is stored on computing system 108 and/or computing system 208, or which is provided by servers 107, devices 102, and/or devices 106. Similarity evaluation module 114/214 may use this process similarity data 324 when performing similarity reconciliation between different process workflows that are being compared.

Override data 338 is configuration data that may also be stored on computing system 108/208 or provided as input by servers 107, devices 102, and/or devices 106. Override data 338 may represent, e.g., a set of pre-existing manual or otherwise determined overrides. These overrides may comprise rule-based instructions (e.g., instructions to refrain from matching any business process pairs between a particular process workflow/sub-workflow (e.g., for a first line of business) and another process workflow/sub-workflow (e.g., for another line of business). The overrides may also comprise an actual list of business process pairs, which, e.g., by certain business-driven reasons, are either to be paired up as being similar, or not to be paired up as being similar, regardless of the result of similarity reconciliation techniques as performed by techniques 341, which are described in further detail below.

Similarity factor evaluation data 340 is configuration data that is also stored by computing system 108/208 and/or provided as input by servers 107, devices 102, and/or devices 106. Similarity factor evaluation data 340 may represents a configured set of factors or evaluation criteria to indicate which aspects of similarity outcome the similarity reconciliation that similarity evaluation module 114/214 has performed on a pair of process workflows (e.g., business processes). In some cases, each similarity factor may be represented in a code or abbreviated code (e.g., "SF.PK.001" for a similarity factor (SF) associated with prior knowledge (PK) based on similarity evaluation criteria 1 (001)).

FIG. 3 also illustrates various techniques 341-350 representing various operations that can be performed during the illustrated similarity reconciliation process. Techniques 341-350 may be performed by process evaluation computing system 108 and/or process evaluation computing system 208 using one or more of inputs 320, 337, 324, 338, and/or 340. For example, similarity evaluation module 114/214 may perform process pair similarity matching 341. In various cases, process workflow data 320 may be modeled as network graphs, where each process workflow is represented by a respective network graph. Similarity evaluation module 114/214 may perform techniques 342-344 in order to perform process pair similarity matching with respect to these network graphs. In particular, similarity evaluation module 214 may use one or more of network graph comparison module 230, computer vision-based comparison module 232, or knowledge-based comparison module 234 to implement one or more of techniques 342-344 as part of the similarity matching process.

For instance, network graph comparison module 230 may perform a network graph-driven comparison 342 of a pair of process workflows to determine any similarities between these workflows. Network graph comparison module 230 may be configured to perform an "isomorphism" driven comparison of two business processes to determine the degree of their similarity, or any other network graph-based similarity comparison. Network graph comparison module 230 may be configured to provide a result of comparison in a "True" (e.g., both business processes are similar) or "False" (e.g., both business processes are not similar) format, or a proximity or confidence level similarity captured result (e.g., the two business processes are "80%" similar). This comparison can evaluation whole business processes and/or portions of these process, such as partial business processes (e.g., sub-processes or sub-workflows).

Computer vision-based comparison module 232 may be configured to perform a computer vision (CV) driven image comparison 343 of each pair of business processes. For instance, an image of a given business process may be provided as a result of its mapping to visual characteristic data 337 (e.g., to be in a particular shape/size/color format), with focus in providing a generic visual "finger print" of the process workflow, or portion of such workflow. Similar to network-graph driven comparison 342, the result of computer vision-drive image comparison 343 can be represented by either a True/False or a similarity confidence percentage. One or more image structural similarity comparison techniques can be implemented to perform the reconciliation.

In some cases, knowledge-based comparison module 234 may be configured to perform a knowledge-based comparison 344 (e.g., using process similarity data 224). In some cases, knowledge-based comparison module 234 may perform such a knowledge-based comparison 344 to, e.g., pair up two business processes which, by reference input of process similarity data 324 (e.g., prior process similarity knowledge), are previously known to be similar. Similar to comparison 342 and comparison 343, the result of the pairing can be represented by a True/False or a similarity confidence percentage.

As indicated in FIG. 3, the output of one or more of comparisons 342, 343, 344 may be provided as input for process pair tagging 345. Process pair tagging represents a tagging process used by or for comparisons 342, 343, 344 to label each pair of business processes with respect to the degree of their similarity and, e.g., by which similarity factor included in similarity factor evaluation data 340. Process pair tagging 345 may, in certain particular examples, capture attributes such as (1) an ID for a first process workflow (e.g., iGrafx workflow I), (2) an ID for a second process workflows (e.g., iGrafx workflow II), (3) a similarity factor used (e.g., from similarity factor evaluation data 340), (4) a similarity outcome (e.g., True or False), and/or (5) a weight as prescribed in similarity factor evaluation data 340.

Similarity evaluation module 114/214 (e.g., using one or more of process comparison modules 228) may perform exception processing 346 to identify exceptions to the process pair similarity matching performed by process comparison modules 228. Exception processing 346 is designed to leverage instructions provided as input from process pair tagging 345, override data 338, and/or similarity factor evaluation data 340. In some cases, exception processing 346 may result in pairing up or breaking up of specific business process pairs.

Similarity evaluation module 114/214 (e.g., using one or more of process comparison modules 228) may, in some examples also perform matching result consolidation 347. Similarity result consolidation 347 represents the act in which the net result of the similarity match may being consolidated in a certain data format to be processed by subsequent tasks, such as tasks 348. Similarity evaluation module 114/214 may also perform data enrichment to the result to improve its usability.

Similarity evaluation module 114/214 (e.g., using one or more of process comparison modules 228) and/or process clustering module 116/216 may further utilize one or more tasks 348, such as similarity weight scoring 349, threshold screening 350, and/or process clustering 351. For example, similarity evaluation module 114/214 and/or process clustering module 116/216 may perform similarity weight scoring 349 to score each pair of business processes according to, e.g., configured weights indicated in similarity factor evaluation data 340. For example, similarity evaluation module 114/214 may determine that a given pair of business processes may have five matching hits, each by one (e.g., by a different one) of the similarity factors included in similarity factor evaluation data 340. The similarity weight scoring 349 may then calculate an aggregated score for the given business process pair.

Similarity evaluation module 114/214 and/or process clustering module 116/216 may perform threshold screening 350 to screen the scored results that are output from similarity weight screening 349. For instance, threshold screening 350 may apply a respective business-driven threshold to scored results in order to keep or maintain only those matching business processes that are deemed similar, with scores exceeding specific cutoff points, thresholds, or percentages. In some cases, these cutoffs may be determined by business-driven objectives or needs.

Process clustering module 116/216 may then performing process clustering 351. Process clustering module 116/216 may perform process clustering 351 to group business processes into clusters based on their similarity. In various examples, process clustering 351 may include one or more network graph clustering techniques to perform such clustering. As shown in FIG. 3, process clustering module 116/216 may perform process clustering 351 to cluster business processes into one or more common process groups or buckets 352. For instance, process clustering module 116/216 may cluster a first portion of a first workflow process and a first portion of a second process workflow into one common process group within process groups 352, and may also cluster a second portion of the first workflow process and a second portion of the second process workflow into another common process group within process groups 352. Process groups 352 may include individual groups, clusters, or "buckets" of business processes (or portions thereof) that are deemed similar as a result of the similarity reconciliation process.

In certain examples, the similarity reconciliation process illustrated in FIG. 3 may provide process groups 352 through another level of exception processing 354. Exception processing 354 may function similarly to exception processing 346, utilizing override data 338 to provide an override mechanism that identifies exceptions to the process pair similarity matching performed by tasks 348 with respect to process groups 352. In some cases, exception processing 354 may result in pairing up or breaking up of specific business process pairs from process groups 352. However, exception processing 346 may comprise a pre-processing override mechanism, while exception processing 354 may comprise a post-processing override mechanism. In some cases, the similarity reconciliation process of FIG. 3 may include only one of exception processing 346 or exception processing 354. In other cases, the similarity reconciliation process may include both exception processing 346 and exception processing 354. As a result, the automated workflow analysis of process workflow data in the similarity reconciliation process of FIG. 3 may provide an override mechanism can be configured to be applied as a pre-processing mechanism using exception processing 346 and/or a post-processing mechanism using exception processing 354 to identify exceptions to the clustering of the one or more portions of the process workflows into one or more common process groups included in process groups 352. This mechanism provides greater flexibilities and design benefits as to how and where in the workflow the override mechanism is applied. This mechanism may also enable a given process group or type of process groups within process groups 352 to be dismantled due to whatever business need and/or reason may be prescribed by override data 338.

The similarity reconciliation process illustrated in FIG. 3 may output or provide the results from process groups 352 and/or from exception processing 354 to process cluster data 326. In particular, the process groups 352 generated by process clustering module 216 and/or exception processing 354 may be output or stored into process cluster data 326. Process cluster data 326 includes information that represents the result of the business process clustering. Process cluster data 326 can be stored in a specific database format or other physical file format readable by downstream users or processes. In addition, in various cases, certain aspects of the result and/or process cluster data 326 can be fed into the process as part of a feedback loop design geared for various design purposes. For example, the information from process cluster data 326 can be fed back in or stored in one or more of process workflow data 320 and/or process similarity data 324 and used for subsequent iterations of the similarity reconciliation process shown in FIG. 3 when attempting to identify similarities between other groups of process workflows.

In addition, FIG. 3 also illustrates downstream nodes 353. Nodes 353 (e.g., reporting and/or analytics nodes) may represent the downstream utilization of the business process clusters or groups 352 that are stored in process cluster data 326. These downstream nodes 353 can be users, reporting and/or analytics jobs, or other forms of tools or process domains that may utilize process cluster data 326.

Figure 4:
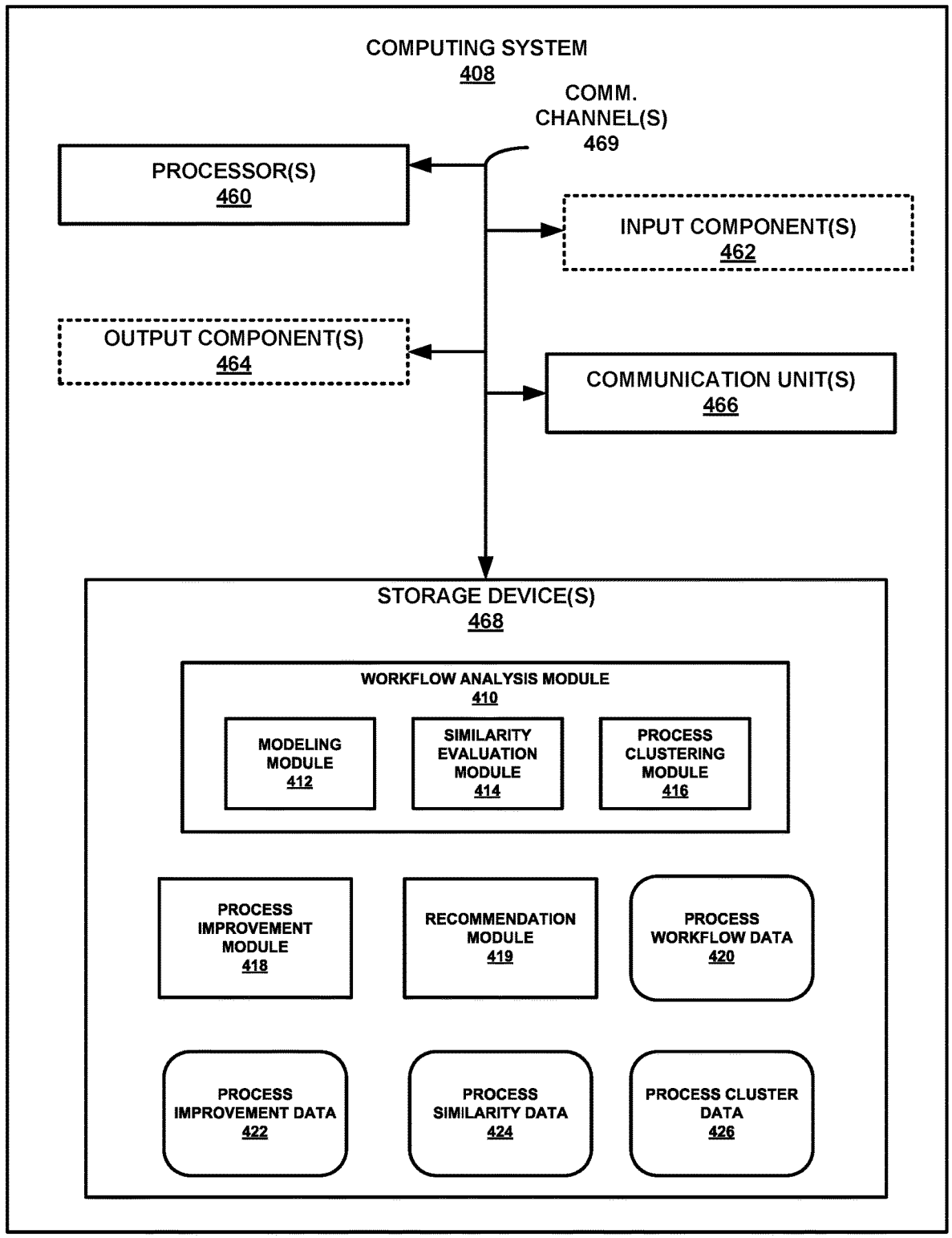
FIG. 4 is a block diagram illustrating further details of an example process evaluation computing system, in accordance with techniques of this disclosure.

FIG. 4 is a block diagram illustrating further details of an example computing system 408, in accordance with techniques of this disclosure. Computing system 408 shown in FIG. 4 may be one example of process evaluation computing system 108 (FIG. 1) and/or process evaluation computing system 208 (FIG. 2).

Computing system 408 may be implemented as any suitable computing device, machine, or system, such as one or more server computers, workstations, mainframes, appliances, cloud computing systems, and/or other computing systems that may be capable of performing operations and/or functions described in accordance with one or more aspects of the present disclosure. In some examples, computing system 408 may comprise one or more physical entities, while in other examples, it may comprise one or more virtual entities (e.g., virtual machines). FIG. 4 illustrates only one particular example of computing system 408, and many other examples of system 408 may be used in other instances and may include a subset of the components shown in, or may include additional components not shown in, FIG. 4.

As illustrated, computing system 408 includes one or more processors 460, one or more optional input components 462, one or more communication units 466, one or more optional output components 464, and one or more storage devices 468. Communication channels 469 may interconnect each of the components 460, 462, 464, 466, and 468 for inter-component communications (physically, communicatively, and/or operatively). In some examples, communication channels 469 may include a system bus, a network connection, an inter-process communication data structure, or any other method for communicating data between hardware and/or software.

One or more input components 462 of computing system 408 may receive input. Examples of input are tactile, audio, and video input. Examples of input components 462 include a presence-sensitive screen, touch-sensitive screen, mouse, keyboard, voice responsive system, video camera, microphone or any other type of device for detecting input from a human or machine.

One or more output components 464 of computing system 408 may generate output. Examples of output are tactile, audio, and video output. Examples of output components 464 include a presence-sensitive screen, sound card, video graphics adapter card, speaker, cathode ray tube (CRT) monitor, liquid crystal display (LCD), or any other type of device for generating output to a human or machine. Output components 464 may include display devices such as cathode ray tube (CRT) monitor, liquid crystal display (LCD), or any other type of device for generating tactile, audio, and/or visual output.

One or more communication units 466 of computing system 408 may communicate with one or more other devices via one or more networks by transmitting and/or receiving network signals on the one or more networks. Examples of communication units 466 include a network interface card (e.g. such as an Ethernet card), an optical transceiver, a radio frequency transceiver, or any other type of device that can send and/or receive information, such as through a wired or wireless network. Other examples of communication units 466 may include short wave radios, cellular data radios, wireless Ethernet network radios, as well as universal serial bus (USB) controllers.

One or more storage devices 468 within computing system 408 may store information for processing during operation of computing system 408 (e.g., computing system 408 may store data accessed by one or more modules, processes, applications, or the like during execution). In some examples, storage devices 468 on computing system 408 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. In some cases, storage devices 468 may include redundant array of independent disks (RAID) configurations and one or more solid-state drives (SSD's).

Storage devices 468, in some examples, also include one or more computer-readable storage media. Storage devices 468 may be configured to store larger amounts of information than volatile memory. Storage devices 468 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 468 may store program instructions and/or data associated with one or more software/firmware elements or modules.

For example, when computing system 408 comprises an example of process evaluation computing system 108 shown in FIG. 1, storage devices 468 may store instructions and/or data associated with workflow analysis module 410 (including modeling module 412, similarity evaluation module 414, and process clustering module 416), process improvement module 418, recommendation module 419, process workflow data 420, process improvement data 422, process similarity data 424, and process cluster data 426. These may be examples of similarly named components shown in FIG. 1. In other examples, these may be examples of similarly named components of process evaluation computing system 208 (FIG. 2). Storage devices 468 may store instructions and/or data associated with further components not shown in FIG. 4. For example, storage devices 468 may store instructions and/or data associated with components similar to network graph comparison module 230, computer vision-based comparison module 232, and knowledge-based comparison module 234 included in process comparison modules 228 (FIG. 2), machine learning module 236, visual characteristic data 237, override data 238, and similarity factor evaluation data 240.

Computing system 408 further includes one or more processors 460 that may implement functionality and/or execute instructions within computing system 408. For example, processors 460 may receive and execute instructions stored by storage devices 468 that execute the functionality of the elements and/or modules described herein. These instructions executed by processors 460 may cause computing system 408 to store information within storage devices 468 during program execution. Processors 460 may also execute instructions of the operating system to perform one or more operations described herein.

Figure 5:
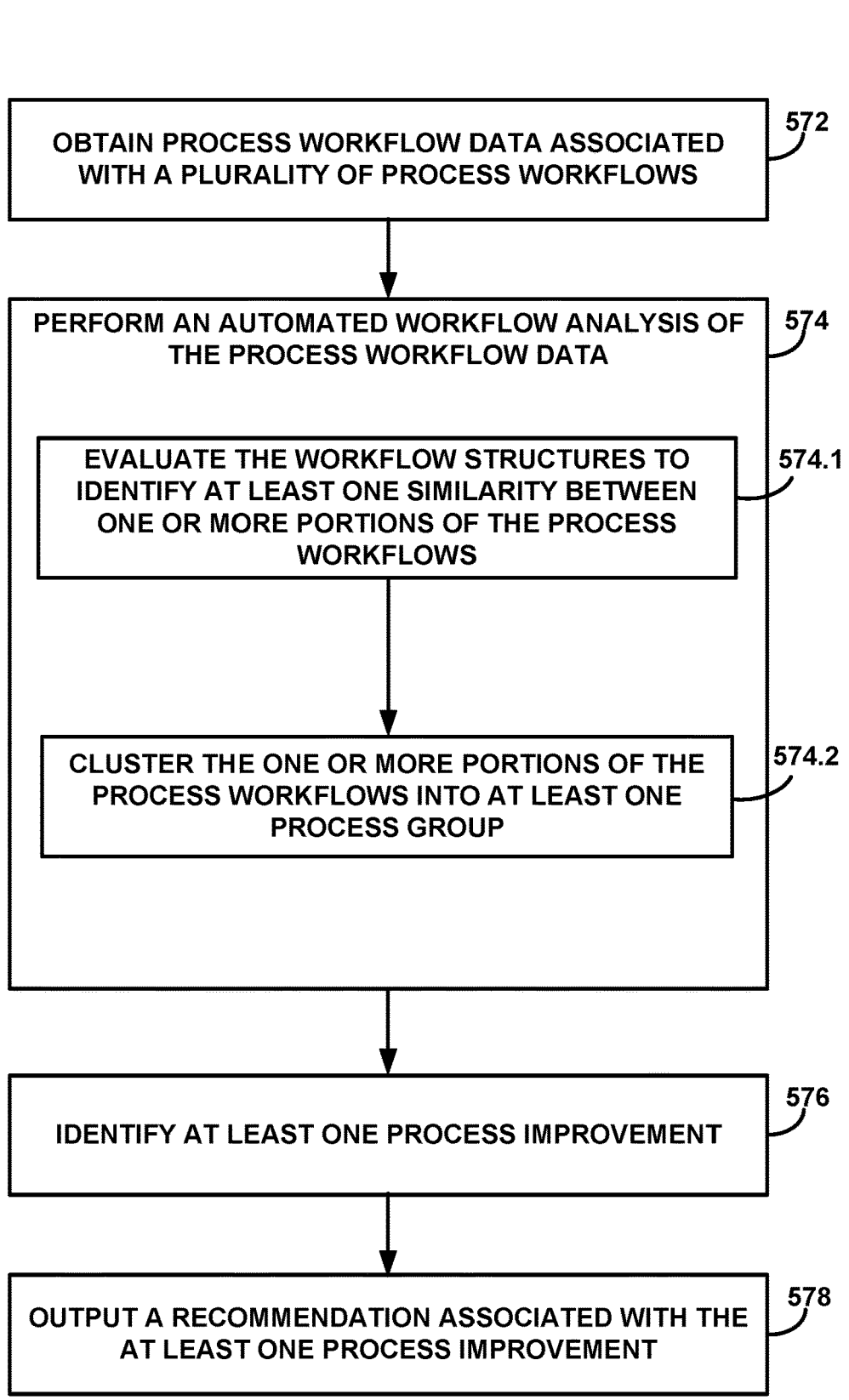
FIG. 5 is a flow diagram illustrating example operations to perform an automated evaluation of process workflows, in accordance with techniques of this disclosure.

FIG. 5 is a flow diagram illustrating example operations to perform an automated evaluation of process workflows, in accordance with techniques of this disclosure. As indicated in the example of FIG. 5, example process 570 includes operations 572, 574 (including operations 574.1, 574.2), 576, and 578. In various examples, process evaluation computing system 108 (FIG. 1) and/or process evaluation computing system 208 (FIG. 2) may perform process 570. For purposes of illustration only, in the description of FIG. 5 below, it will be assumed that process evaluation computing system 108 performs the recited operations while interacting with other entities in distributed system 100.

Workflow analysis module 110 of process evaluation computing system 108 may obtain (572) process workflow data 120 associated with a group of process workflows. Each of the process workflows may comprise a plurality of tasks that are carried out to execute a respective business process and to achieve a respective business outcome. Workflow analysis module 110 may perform (574) an automated workflow analysis of the process workflow data using modeling module 112, similarity evaluation module 114, and process clustering module 116.

For example, similarity evaluation module 114 may evaluate (574.1) workflow structures to identify at least one similarity between one or more portions of the process workflows, where the workflow structures are modeled from the process workflow data. Similarity evaluation module 114 may store information associated with this at least one similarity in process similarity data 124. Responsive to evaluation of the workflow structures, process clustering module 116 may cluster (574.2), based on the at least one similarity, the one or more portions of the process workflows into at least one common process group that is shared between the process workflows. Process clustering module 116 may store information associated with this clustering and the at least one common process group in process cluster data 126.

Process improvement module 118 may identify (576), based on the at least one common process group shared between the process workflows, at least one process improvement that is associated with at least one of the process workflows. Process improvement module 118 may store information associated with the at least one process improvement in process improvement data 122. Recommendation module 119 may output (578) a recommendation associated with the at least one process improvement. For example, recommendation module 119 may output this recommendation to one or more of devices 102 and/or agent devices 106, which may output the recommendation for display to one or more users.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random access memory (RAM), read-only memory (ROM), electrically erasable and programmable ROM (EEPROM), compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application-specific integrated circuits (ASICs), field-programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    obtaining, by a computing system comprising one or more processors, process workflow data associated with a plurality of process workflows, wherein each of the process workflows comprises a plurality of tasks that are carried out to execute a respective business process and to achieve a respective business outcome;
    performing, by the computing system, an automated workflow analysis of workflow structures modeled from the process workflow data, wherein the workflow structures comprise network graphs that represent the process workflows, wherein performing the automated workflow analysis comprises:
        evaluating, by one or more machine learning models maintained by the computing system, the workflow structures according to one or more evaluation criteria having corresponding weights to identify at least one similarity between a group of nodes of the network graphs that represent the process workflows; and
        responsive to evaluating the workflow structures, clustering, by the computing system and based on the at least one similarity, the group of nodes of the network graphs that represent the process workflows into at least one common process group that is shared between the process workflows;
    identifying, by the computing system and based on the at least one common process group shared between the process workflows, at least one process improvement that is associated with at least one of the process workflows;
    outputting, by the computing system, a recommendation associated with the at least one process improvement; and
    updating, by the computing system, the one or more machine learning models to modify the corresponding weights for at least one of the one or more evaluation criteria used to evaluate the workflow structures based at least on a result of the clustering.

2. The method of claim 1, further comprising:
    modeling, by the computing system and based on the process workflow data, the process workflows as the workflow structures that represent the process workflows.

3. The method of claim 1,
    wherein the network graphs including nodes and edges that are associated with one or more labels, weights, or directionality.

4. The method of claim 1, wherein evaluating the workflow structures to identify the at least one similarity between the group of nodes of the network graphs that represent the process workflows comprises:
    identifying, by the computing system based on one or more network graph comparison techniques, the at least one similarity between the group of nodes of the network graphs.

5. The method of claim 4, wherein the one or more network graph comparison techniques comprise one or more of isomorphism-based network graph comparison techniques.

6. The method of claim 1, wherein evaluating the workflow structures to identify the at least one similarity between the group of nodes of the network graphs that represent the process workflows comprises:
   identifying, by the computing system based on one or more computer vision-based comparison techniques, the at least one similarity between the group of nodes of the network graphs.

7. The method of claim 6, further comprising:
   obtaining, by the computing system, visual characteristic data that identifies one or more visual characteristics of portions of previously identified process workflows,
   wherein identifying, based on the one or more computer vision-based comparison techniques, the at least one similarity between the group of nodes of the network graphs comprises:
      mapping, by the computing system, the visual characteristic data to the network graphs to translate the group of nodes of network graphs into node objects each having at least one shape or color-coded visual format; and
      performing, by the computing system based on the one or more computer-vision comparison techniques, an image comparison of at least one of the shapes or color-coded visual formats of the node objects to identify the at least one similarity between the group of nodes.

8. The method of claim 1, wherein evaluating the workflow structures to identify the at least one similarity between the group of nodes of the network graphs comprises:
   identifying, by the computing system based on one or more knowledge-based comparison techniques, the at least one similarity between the group of nodes of the network graphs that represent the process workflows, wherein the one or more knowledge-based comparison techniques utilize pre-existing information that identifies similarities between previously identified process workflows.

9. The method of claim 1, wherein the at least one process improvement that is associated with at least one of the process workflows includes one or more changes to at least one of the workflows, and wherein the one or more changes comprise one or more of a process consolidation, a process standardization, a process elimination, or a process simplification with respect to at least one of the process workflows.

10. The method of claim 1, wherein identifying the at least one process improvement that is associated with at least one of the process workflows comprises:
   determining, by the computing system and based on the at least one common process group shared between the process workflows, a likelihood of achieving an improvement to at least one of the process workflows via a consolidation of the group of nodes of the network graphs that represent the process workflows included in the at least one common process group that is shared between the process workflows; and
   responsive to determining that the likelihood of achieving the improvement to at least one of the process workflows exceeds a threshold, identifying, by the computing system, the at least one process improvement that comprises the consolidation of the group of nodes of the network graphs that represent the process workflows included in the at least one common process group.

11. The method of claim 1,
   wherein the process workflows comprise at least a first process workflow and a second process workflow,
   wherein the group of nodes of the network graphs that represent the process workflows comprise at least a first sub-workflow of the first process workflow and a second sub-workflow of the second process workflow,
   wherein evaluating the workflow structures to identify the at least one similarity comprises evaluating, by the computing system, the workflow structures to identify at least one sub-workflow similarity between the first sub-workflow and the second sub-workflow, and
   wherein clustering the group of nodes of the network graphs that represent the process workflows into the at least one common process group comprises clustering, by the computing system and based on the at least one sub-workflow similarity, the first sub-workflow and the second sub-workflow into the at least one common process group that is shared between the first and second process workflows.

12. The method of claim 1,
   wherein the process workflows comprise at least a first process workflow and a second process workflow,
   wherein evaluating the workflow structures to identify the at least one similarity comprises:
      evaluating, by the computing system, the workflow structures to identify a first similarity between a first node of the first process workflow and a first node of the second process workflow; and
      evaluating, by the computing system, the workflow structures to identify a second similarity between a second node of the first process workflow and a second node of the second process workflow; and
   wherein clustering the group of nodes of the network graphs that represent the process workflows into the at least one common process group comprises:
      clustering, by the computing system and based on at least the first similarity, the first node of the first process workflow and the first node of the second process workflow into a first common process group that is shared between the first and second process workflows; and
      clustering, by the computing system and based on at least the second similarity, the second node of the first process workflow and the second node of the second process workflow into a second common process group that is shared between the first and second process workflows.

13. The method of claim 12, wherein identifying the at least one process improvement that is associated with at least one of the process workflows comprises:
   identifying, by the computing system and based on the first common process group shared between the first and second process workflows, a first process improvement that is associated with at least one of the first or second process workflows; and
   identifying, by the computing system and based on the second common process group shared between the first and second process workflows, a second process improvement that is associated with at least one of the first or second process workflows.

14. The method of claim 1, further comprising:
obtaining, by the computing system, similarity factor evaluation data that includes the one or more evaluation criteria for use in performing similarity reconciliation.

15. The method of claim 1,
wherein obtaining the process workflow data associated with the process workflows comprises receiving, by the computing system and from one or more computing devices, the process workflow data, and
wherein the process workflow data includes one or more of activity data, interfacing data, or attribute data associated with each of the process workflows.

16. The method of claim 1, wherein performing the automated workflow analysis of the process workflow data comprises applying, by the computing system, at least one of a pre-processing mechanism or a post-processing mechanism to identify exceptions to the clustering of the group of nodes of the network graphs that represent the process workflows into the at least one common process group.

17. A computing system comprising:
one or more processors; and
at least one computer-readable storage device storing instructions that are executable by the one or more processors to:
obtain process workflow data associated with a plurality of process workflows, wherein each of the process workflows comprises a plurality of tasks that are carried out to execute a respective business process and to achieve a respective business outcome;
perform an automated workflow analysis of workflow structures modeled from the process workflow data, wherein the workflow structures comprise network graphs that represent the process workflows, wherein to perform the automated workflow analysis, the instructions are executable by the one or more processors to:
evaluate, using one or more machine learning models maintained by the computing system, the workflow structures according to one or more evaluation criteria having corresponding weights workflows to identify at least one similarity between a group of nodes of the network graphs that represent the process workflows; and
responsive to evaluating the workflow structures, cluster, based on the at least one similarity, the group of nodes of the network graphs that represent the process workflows into at least one common process group that is shared between the process workflows;
identify, based on the at least one common process group shared between the process workflows, at least one process improvement that is associated with at least one of the process workflows;
output a recommendation associated with the at least one process improvement; and
update the one or more machine learning models to modify the corresponding weights for at least one of the one or more evaluation criteria used to evaluate the workflow structures based at least on a result of the clustering.

18. The computing system of claim 17,
wherein the network graphs including nodes and edges that are associated with one or more labels, weights, or directionality.

19. The computing system of claim 17, wherein the instructions stored on the at least one computer-readable storage device that are executable by the one or more processors to evaluate the workflow structures to identify the at least one similarity between the group of nodes of the network graphs that represent the process workflows are further executable by the one or more processors to:
identify, based on one or more network graph comparison techniques, the at least one similarity between the group of nodes of the network graphs.

20. The computing system of claim 17, wherein the instructions stored on the at least one computer-readable storage device that are executable by the one or more processors to evaluate the workflow structures to identify the at least one similarity between the group of nodes of the network graphs that represent the process workflows are further executable by the one or more processors to:
identify, based on one or more computer vision-based comparison techniques, the at least one similarity between the group of nodes of the network graphs.

21. The computing system of claim 20, wherein the instructions stored on the at least one computer-readable storage device are further executable by the one or more processors to:
obtain visual characteristic data that identifies one or more visual characteristics of portions of previously identified process workflows,
wherein the instructions stored on the at least one computer-readable storage device that are executable by the one or more processors to identify, based on the one or more computer vision-based comparison techniques, the at least one similarity between the group of nodes of the network graphs are further executable by the one or more processors to:
map the visual characteristic data to the network graphs to translate the group of nodes of network graphs into node objects each having at least one shape or color-coded visual format; and
perform, based on the one or more computer-vision comparison techniques, an image comparison of at least one of the shapes or color-coded visual formats of the node objects to identify the at least one similarity between the group of nodes.

22. The computing system of claim 17, wherein the instructions stored on the at least one computer-readable storage device that are executable by the one or more processors to identify the at least one process improvement that is associated with at least one of the process workflows are further executable by the one or more processors to:
determine, based on the at least one common process group shared between the process workflows, a likelihood of achieving an improvement to at least one of the process workflows via a consolidation of the group of nodes of the network graphs that represent the process workflows included in the at least one common process group that is shared between the process workflows; and
responsive to determining that the likelihood of achieving the improvement to at least one of the process workflows exceeds a threshold, identify the at least one process improvement that comprises the consolidation of the group of nodes of the network graphs that represent the process workflows included in the at least one common process group.

23. The computing system of claim 17,
wherein the process workflows comprise at least a first process workflow and a second process workflow,
wherein the group of nodes of the network graphs that represent the process workflows comprise at least a first sub-workflow of the first process workflow and a second sub-workflow of the second process workflow, wherein the instructions stored on the at least one computer-readable storage device that are executable by the one or more processors to evaluate the workflow structures to identify the at least one similarity are further executable by the one or more processors to evaluate the workflow structures to identify at least one sub-workflow similarity between the first sub-workflow and the second sub-workflow, and wherein the instructions stored on the at least one computer-readable storage device that are executable by the one or more processors to cluster the group of nodes of the network graphs that represent the process workflows into the at least one common process group are further executable by the one or more processors to cluster, based on the at least one sub-workflow similarity, the first sub-workflow and the second sub-workflow into the at least one common process group that is shared between the first and second process workflows.

24. The computing system of claim 17, wherein the instructions stored on the at least one computer-readable storage device are further executable by the one or more processors to:

obtain similarity factor evaluation data that includes the one or more evaluation criteria for use in performing similarity reconciliation.

25. A computer-readable storage device storing instructions that, when executed, cause at least one processor to:

obtain process workflow data associated with a plurality of process workflows, wherein each of the process workflows comprises a plurality of tasks that are carried out to execute a respective business process and to achieve a respective business outcome;

perform an automated workflow analysis of workflow structures modeled from the process workflow data, wherein the workflow structures comprise network graphs that represent the process workflows, wherein to perform the automated workflow analysis, the instructions cause the at least one processor to:

evaluate, using one or more machine learning models, the workflow structures according to one or more evaluation criteria having corresponding weights to identify at least one similarity between a group of nodes of the network graphs that represent the process workflows; and responsive to evaluating the workflow structures, cluster, based on the at least one similarity, the group of nodes of the network graphs that represent the process workflows into at least one common process group that is shared between the process workflows;

identify, based on the at least one common process group shared between the process workflows, at least one process improvement that is associated with at least one of the process workflows;

output a recommendation associated with the at least one process improvement; and update the one or more machine learning models to modify the corresponding weights for at least one of the one or more evaluation criteria used to evaluate the workflow structures based at least on a result of the clustering.

* * * * *